United States Patent
Nagarajan et al.

(10) Patent No.: US 11,582,107 B1
(45) Date of Patent: Feb. 14, 2023

(54) METHOD TO CONFIGURE A COMPLEX COLLECTION OF INFORMATION HANDLING SYSTEMS

(71) Applicant: Dell Products L.P., Round Rock, TX (US)

(72) Inventors: Karthick Nagarajan, Bangalore (IN); Kumar Prashant, Bangalore (IN); Suren Kumar, Tamil Nadu (IN); Vinod Durairaj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/383,924

(22) Filed: Jul. 23, 2021

(51) Int. Cl.
*H04L 41/0866* (2022.01)
*H04L 41/12* (2022.01)
*H04L 41/22* (2022.01)
*H04L 41/0806* (2022.01)

(52) U.S. Cl.
CPC ...... *H04L 41/0866* (2013.01); *H04L 41/0806* (2013.01); *H04L 41/12* (2013.01); *H04L 41/22* (2013.01)

(58) Field of Classification Search
CPC ....... H04L 41/12; H04L 41/22; H04L 41/145; H04L 41/0806; H04L 45/02; H04L 41/0886; H04L 41/0803; H04L 41/0866
See application file for complete search history.

(56) References Cited

U.S. PATENT DOCUMENTS

| | | | |
|---|---|---|---|
| 10,277,485 B1 * | 4/2019 | Richard | H04L 43/50 |
| 10,425,290 B1 * | 9/2019 | Oren | H04L 45/02 |
| 2004/0143560 A1 * | 7/2004 | Zhu | G06N 7/005 700/28 |
| 2010/0205535 A1 * | 8/2010 | Mitamura | G05B 19/052 715/735 |
| 2014/0010109 A1 * | 1/2014 | Himura | H04L 41/12 370/254 |
| 2017/0324621 A1 * | 11/2017 | Estes | H04L 41/12 |
| 2018/0254955 A1 * | 9/2018 | Ranjan | H04L 41/22 |
| 2019/0036814 A1 * | 1/2019 | Aranha | H04L 45/64 |
| 2020/0044940 A1 * | 2/2020 | Thomasson | H04L 41/22 |
| 2021/0409277 A1 * | 12/2021 | Jeuk | H04L 41/14 |
| 2022/0006701 A1 * | 1/2022 | Patel | H04L 43/08 |

\* cited by examiner

*Primary Examiner* — Tonia L Dollinger
*Assistant Examiner* — Linh T. Nguyen
(74) *Attorney, Agent, or Firm* — McDermott Will & Emery LLP (57) ABSTRACT

A topology configuration system receives a graphic representation comprising object images of information handling systems to be configured for operating as a complex collection of information handling systems, uses artificial intelligence and deep learning to analyze images on the graphic representation and determine specific information handling systems present in the complex collection of information handling systems. A requirement list is used to create a configuration job. Sets of user instructions are sent to a user to guide the user and sets of device instructions are sent to each information handling system so that the user can configure the plurality of information handling systems to operate as the complex collection of information handling systems. Validation packets may be sent to each information handling system to confirm the complex collection of information handling systems is set up quickly and with little or no troubleshooting.

12 Claims, 6 Drawing Sheets

METHOD TO CONFIGURE A COMPLEX COLLECTION OF INFORMATION HANDLING SYSTEMS

BACKGROUND

Field of the Disclosure

This disclosure relates generally to complex collections of information handling systems and, more particularly, to systems for configuring complex collections of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may form part of a larger, complex collection of information handling systems. For example, data centers may comprise rows of racks, with each rack containing multiple information handling systems. Furthermore, the information handling systems may comprise different components for different functionality, such as servers for processing, storage drives for storing information and switches for allowing communication between multiple servers and multiple storage drives. Each component or information handling system may require different connections, such as an Ethernet connection or a SAS connection, may use different protocols and have other requirements.

SUMMARY

Embodiments disclosed herein may be generally directed to complex collections of information handling systems and methods for ensuring the collection is interconnected properly.

In some embodiments, a user provides a graphic representation comprising a plurality of object images, wherein each object image represents an information handling system, wherein each information handling system represented by an object is selected for including in a plurality of information handling systems configured for operating as a complex collection of information handling systems. In some embodiments, a user imports a graphic representation by scanning a document containing object images. In some embodiments, a user imports a logical flow diagram, such as by scanning a document containing object images. In some embodiments, a user may interact with a graphical user interface to create a graphic representation.

Embodiments receive a graphical diagram comprising object images, wherein each object image corresponds to an information handling system of a plurality of information handling systems selected for operating as a complex collection of information handling systems to be configured. Based on the diagram (graphical or logical), the appropriate configuration will be performed to all the information handling systems such as compute, storage, network, etc. Embodiments determine a system configuration for the plurality of information handling systems such that the plurality of information handling systems operate as the complex collection of information handling systems. Embodiments send sets of user instructions to instruct a user how to connect a first information handling system to a network. Embodiments may then communicate with the first information handling system to start adding information handling systems and configuring each information handling system to a network. Embodiments send sets of user instructions to instruct the user which information handling system to add and how to connect it to other information handling systems, and sends sets of device instructions to information handling systems to assist the user in connecting each information handling system.

Once an information handling system is connected to the enterprise network, embodiments communicate with the information handling system and configure the information handling system based on the intended system configuration. Access credentials for each information handling system communicated by the user when the graphic representation was received can be used for a seamless configuration.

Once the plurality of information handling systems are installed and configured according to the intended system configuration, embodiments may validate that the plurality of information handling systems operate as the complex collection of information handling systems.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 3:
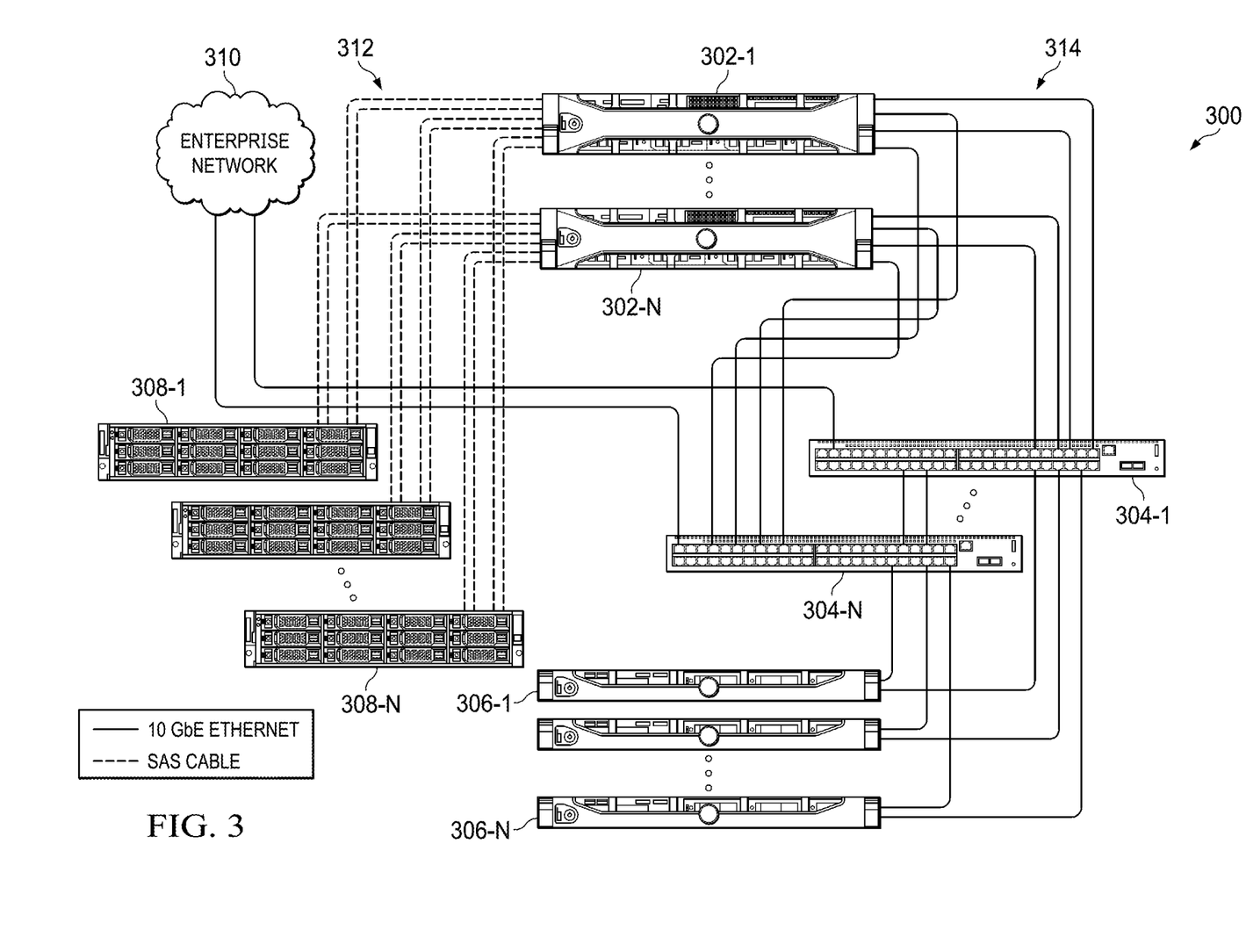
FIG. 3 is a diagram of an exemplary complex collection of information handling systems.

As used herein, a hyphenated form of a reference numeral refers to a specific instance of an element and the un-hyphenated form of the reference numeral refers to the collective or generic element. Thus, for example, object image "302-1" refers to an instance of an object image of a server, which may be referred to collectively as object images "302" or server images "302" and any one of which may be referred to generically as object image "302" or server image "302."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a switch, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as lights, audio output systems and one or more video displays. The information handling system may also include one or more buses operable to transmit communication between the various hardware components.

Particular embodiments are best understood by reference to FIGS. 1-9, wherein like numbers are used to indicate like and corresponding parts.

Figure 1:
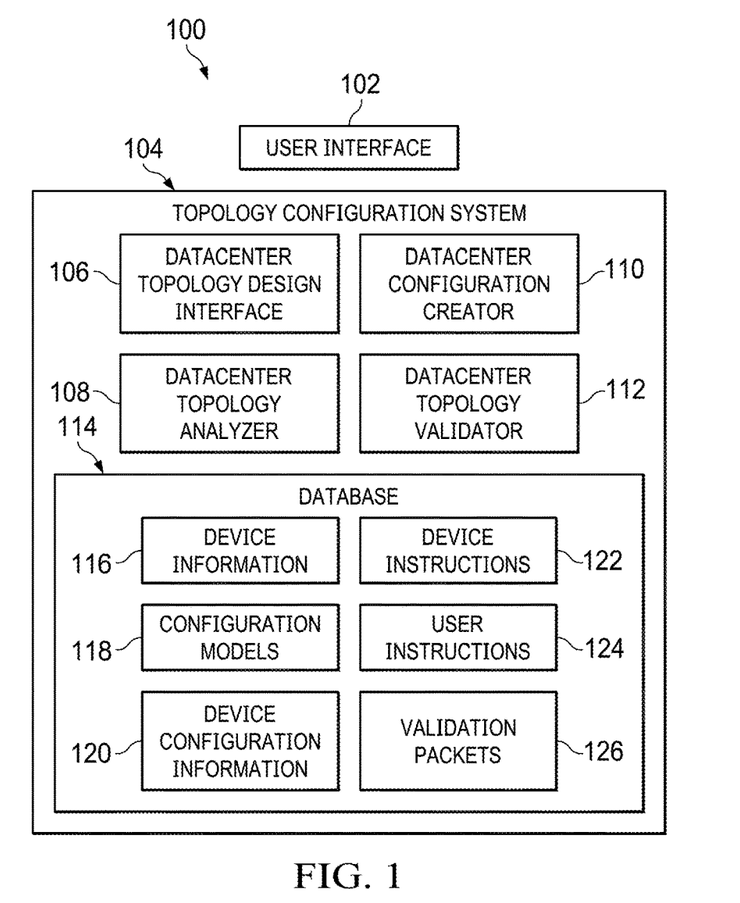
FIG. 1 is a block diagram of selected elements of an embodiment of a system for analyzing a complex collection of information handling systems, determining a configuration for the complex collection of information handling systems and communicating instructions for configuring complex collection of information handling systems.

Turning to the drawings, FIG. 1 illustrates a block diagram of selected elements of an embodiment of a system 100 for analyzing a complex collection of information handling systems, determining a configuration for the complex collection of information handling systems and communicating instructions for configuring a complex collection of information handling systems.

As shown in FIG. 1, components of system 100 may include, but are not limited to, user interface 102 for receiving instructions and information from a user, topology configuration system 104 comprising datacenter topology design interface 106, datacenter topology analyzer 108, datacenter configuration creator 110 and datacenter topology validator 112. Topology configuration system 104 also includes database 114 storing device information 116, configuration models 118, device configuration information 120, device instructions 122, user instructions 124 and validation packets 126. It is noted that FIG. 1 is not drawn to scale but is a schematic illustration.

Embodiments of system 100 may be implemented on a separate information handling system (not shown) comprising a processor subsystem, which may comprise one or more processors, a memory subsystem, an I/O subsystem, a local storage resource, and a network interface. A processor subsystem may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, a processor subsystem may interpret and execute program instructions and process data stored locally (e.g., in a memory subsystem). In the same or alternative embodiments, a processor subsystem may interpret and execute program instructions and process data stored remotely (e.g., in a network storage resource). A memory subsystem may comprise a system, device, or apparatus operable to retain and retrieve program instructions and data for a period of time (e.g., computer-readable media). A memory subsystem may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to an associated information handling system is powered down. An I/O subsystem may comprise a system, device, or apparatus generally operable to receive and transmit data to or from or within system 100. An I/O subsystem may represent, for example, a variety of communication interfaces, graphics interfaces, video interfaces, user input interfaces, and peripheral interfaces. In various embodiments, an I/O subsystem may be used to support user interface 102 which may include peripheral devices, such as a touch panel, a display adapter, a keyboard, a touch pad, or a camera, among other examples. In some implementations, an I/O subsystem may support so-called 'plug and play' connectivity to external devices, in which the external devices may be added or removed while system 100 is operating. A local storage resource may comprise computer-readable media (e.g., hard disk drive, floppy disk drive, CD-ROM, and other type of rotating storage media, flash memory, EEPROM, or another type of solid-state storage media) and may be generally operable to store instructions and data. A network interface may comprise a suitable system, apparatus, or device operable to serve as an interface between system 100 and a network (discussed in greater detail below). A network interface may enable system 100 to communicate over a network using a suitable transmission protocol or standard. In some embodiments, a network interface may be communicatively coupled via a network to a network storage resource (not shown). A network coupled to a network interface may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to a network interface may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to a network interface or various components associated therewith may be implemented using hardware, software, or any combination thereof. A system bus may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

AI/Deep Learning for Analyzing Graphic Representations and Object Images

Embodiments of system 100 may use artificial intelligence (AI) and deep learning to analyze a complex collection of information handling systems to develop a system configuration that is easier to implement. Computer vision using deep learning understands the content of digital images such as complex system diagrams and network flow diagrams and may be used to map a graphical representation of a complex system or a flow diagram relative to a system diagram or flow diagram stored in database 114. Information may be converted into a network diagram which is used to understand the topology in which a complex collection of information handling systems must be configured. A network diagram such as graphic representation 300 may be created by a user and stored in database 114 as part of a preloaded database. A preloaded graphic representation, device image or other information can be derived using factory configurations, platform supported configurations, telemetry information etc. In some embodiments, Keras is an open-source library that provides a Python interface and may be used for deep learning.

In some embodiments, topology configuration system 104 uses computer vision with a deep learning network model with Convolutional Neural Networks (CNN) for image classification, identification, verification, detection, segmentation and recognition. Convolutional Neural Networks (CNNs) are deep learning model specifically designed for image data. Additionally, both of the following network types (Multi-Layer Perceptron and Recurrent Neural Networks) may be useful for interpreting or developing inference models from the features learned and extracted from CNNs.

Method for Configuring a Complex Collection of Information Handling Systems

Figure 2:
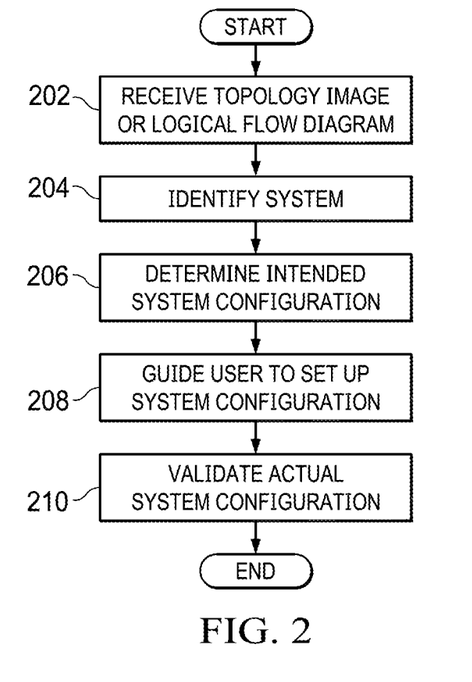
FIG. 2 is a flow diagram of one embodiment of a method for analyzing a complex collection of information handling systems, determining a configuration for the complex collection of information handling systems and communicating instructions for configuring complex collection of information handling systems.

FIG. 2 depicts a flow diagram illustrating a method for configuring a complex collection of information handling systems.

At step 202, embodiments receive a graphical diagram corresponding to the complex collection of information handling systems. In some embodiments, the graphical diagram comprises a plurality of images of information handling systems. In some embodiments, the graphical diagram comprises a logical diagram that references information handling systems.

At step 204, embodiments identify the complex collection of information handling systems. A preloaded model of a complex collection of information handling systems may be found in a datacenter.

At step 206, embodiments determine an intended system configuration for the complex collection of information handling systems.

At step 208, embodiments guide a user to set up the actual (physical) collection of information handling systems based on the intended system configuration.

At step 210, embodiments validate the actual system configuration matches the intended system configuration.

Receiving a Graphic Representation of the Intended System Configuration

FIG. 3 is a graphic representation 300 depicting object images of information handling systems in a complex collection of information handling systems connected to an enterprise network. As depicted in FIG. 3, object images of information handling systems may include a set of first server images 302, switch images 304, a set of second server images 306 and storage device images 308. FIG. 3 further depicts connections 312, 314 between information handling systems represented by the object images. Thus, FIG. 3 includes object images or symbols indicating that switches represented by switch images 304 may be coupled to an enterprise network represented by cloud icon 310, first servers represented by server images 302 may connect to storage devices represented by storage device images 308 using SAS cables represented by SAS cable icons 312, and first servers represented by server images 302 may connect to switches represented by switch images 304 using Ethernet cables represented by Ethernet cable icons 314. Each image depicted in diagram 300 is expected to provide enough detail to accurately identify the information handling system. For example, each switch image 304 shows the number of ports, the location of a power cord receptacle, the location of lights, text or other detailed information for a switch represented by switch image 304. Each server image 302 and 306 shows enough detailed information to be able to distinguish first servers represented by first server images 302 from second servers represented by second server images 306. SAS cables and Ethernet cables are two types of wired connectors for physically connecting two information handling systems.

Figure 4:
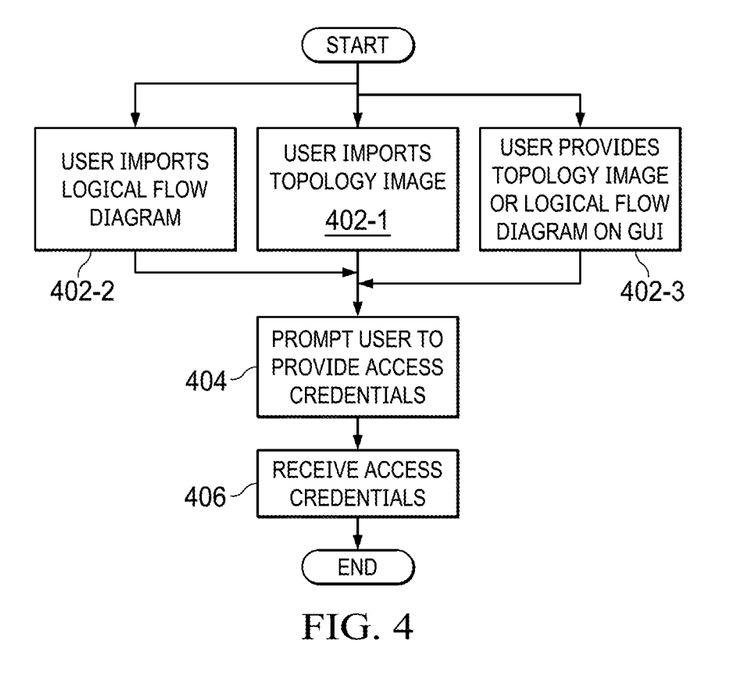
FIG. 4 is a flowgraph depicting a method for receiving a diagram of a complex collection of information handling systems.

FIG. 4 depicts a flow diagram of a method 400 for receiving a graphic representation of a complex collection of information handling systems.

At any of steps 402, a user provides a graphic representation of a complex collection of information handling systems. In some embodiments, at step 402-1, a user imports a topology image as graphic representation 300, such as by scanning a document containing a set of images of information handling systems. In some embodiments, at step 402-2, a user imports a logical flow diagram, such as by scanning a document containing a set of object images corresponding to information handling systems. In some embodiments, at step 402-3, a user may interact with a graphical user interface to create a graphic representation 300 of a complex collection of information handling systems. For example, user interface 102 may include a graphic user interface with tools that allow a user to select images of information handling systems and position them in the display (also known as "drag-and-drop") and further identify what information handling systems should connect with what other information handling systems. Note that the user does not need to specify a particular port.

At step 404, embodiments prompt the user to provide access credentials for each of the information handling systems. Access credentials may be provided via a text box style input that allows the user to input each access credential individually or may be provided via a spreadsheet style input in which all access credentials for all information handling system in a complex collection of information handling systems are entered at the same time.

At step 406, embodiments receive the access credentials. In some embodiments, the received access credentials are stored locally such that, once the complex collection of information handling systems is configured and validated, the access credentials are deleted from memory subsystem. In some embodiments, access credentials may be stored in database 114, such as in device information 116.

Analyzing the Graphic Representation to Determine a Type of System

Figure 5:
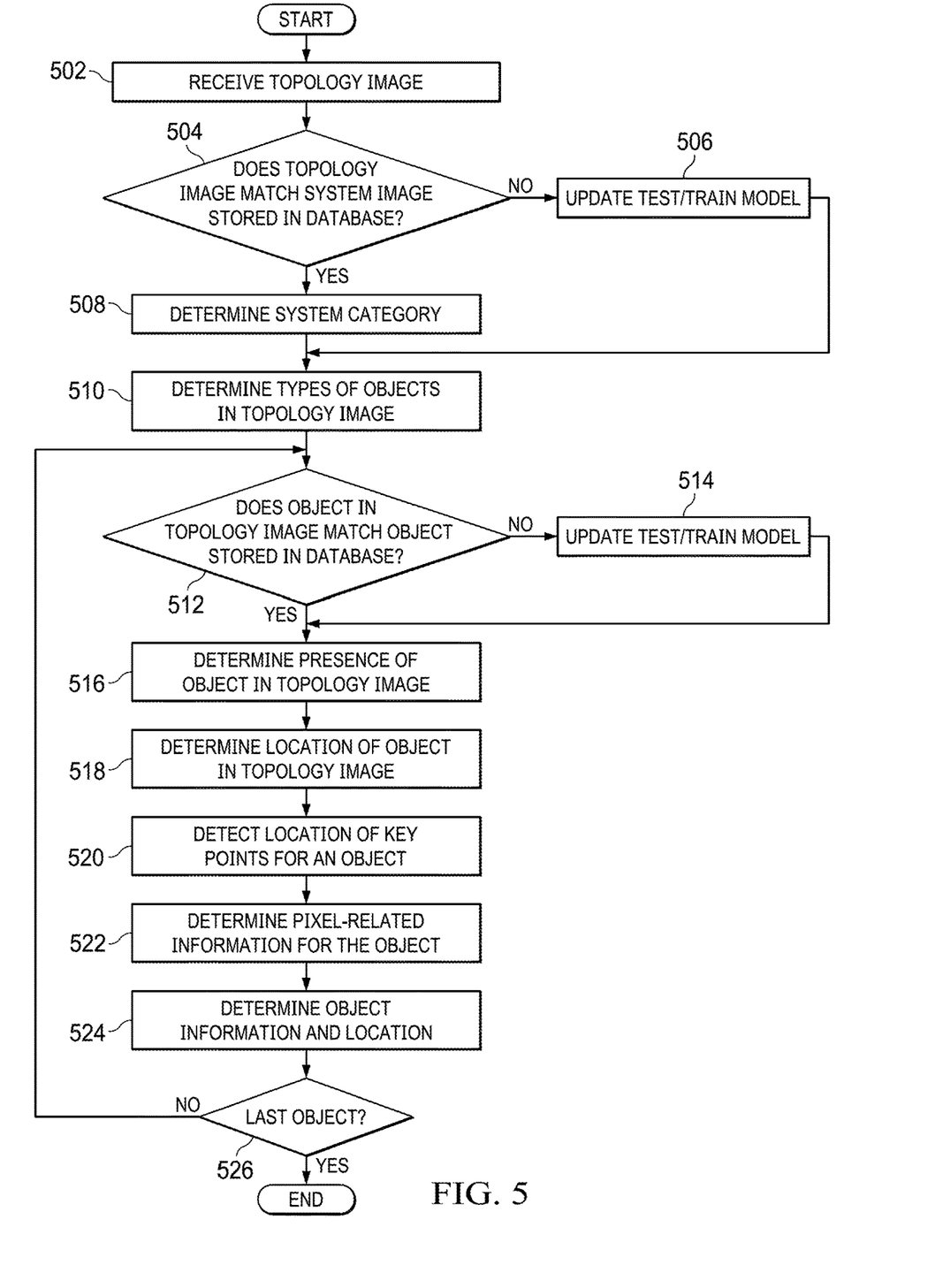
FIG. 5 is a flowgraph depicting a method for analyzing a diagram of a complex collection of information handling systems.

Referring to FIG. 5, embodiments may use a deep learning module with deep learning Application Program Interfaces (APIs) to evaluate graphic representation 300 and compare graphic representation 300 against other graphic representations, object images or device images stored in database 114. In some embodiments, datacenter topology analyzer 108 may use artificial learning or neural networks to identify information handling systems based on object images in graphic representation 300, compare the object images with device images in database 114, and compare graphic representation 300 with other graphic representations in database 114 to understand how each information handling system will communicate and process information. Datacenter topology analyzer 108 may use this knowledge to determine an intended system configuration for the complex collection of information handling systems.

FIG. 5 depicts a flow diagram of a method 500 for analyzing a graphic representation of a complex collection of information handling systems to determine an intended system configuration of the actual collection of information handling systems.

At step 502, embodiments receive graphic representation 300 such as a topology image. FIG. 3 depicts a partial topology image. For example, a complex collection of information handling systems may include many servers represented by first server images 302 but FIG. 3 depicts only two server images 302-1 and 302-N for representing a plurality of first servers.

At step 504, embodiments determine if the received graphic representation 300 matches a graphic representation previously stored in database 114. Datacenter topology analyzer 108 may compare graphic representation 300 with a previous system configuration. For example, database 114 may store configuration models 118 containing preloaded system configurations and system configurations that have been previously validated.

If the received graphic representation 300 does not match a stored graphic representation from database 114, embodiments may initiate a test/train model at step 506, discussed in greater detail below.

If the received graphic representation 300 matches a stored graphic representation from database 114, embodiments may skip initiating the test/train model and determine a system category at step 508.

At step 510, embodiments analyze an object image in the graphic representation to determine a type of object depicted in the graphic representation 300. For example, referring back to FIG. 3, datacenter topology analyzer 108 may analyze graphic representation 300 to determine an object image 302 depicts a first type of server, an object image 304 depicts a type of switch, an object image 306 depicts a second type of server and an object image 308 depicts a type of storage device.

At step 512, embodiments determine, for each object image, if the object image depicted in the graphic representation 300 matches a device image stored in database 114. For example, graphic representation 300 may correspond to a datacenter that has many of each of the following information handling systems: servers, chassis, storage devices and switches. Other information handling systems may be present as well. Datacenter topology analyzer 108 may compare each object image in graphic representation 300 and determine each first server image 302 matches a device image of a Dell PowerEdge R730 server stored in device information 116 in database 114.

If an object image does not match a stored device image from database 114, embodiments may update the test/train model at step 514, discussed in greater detail below.

If an object image depicted in graphic representation 300 matches a stored device image stored in database 114, datacenter topology analyzer 108 determines a presence of the object image in the graphic representation at step 516. There may be several instances of the same object image in graphic representation 300. For example, datacenter topology analyzer 108 may analyze graphic representation 300 and determine the presence of twenty object images 302 corresponding to Dell PowerEdge R730 servers in the collection of information handling systems.

At step 518, datacenter topology analyzer 108 may detect a location of each object image in graphic representation 300. The graphic representation 300 may have object images arranged in various locations based on how a user conceptualized the datacenter. For example, referring back to FIG. 3, datacenter topology analyzer 108 may analyze graphic representation 300 to determine object images 302 are located at the top of graphic representation 300.

At step 520, datacenter topology analyzer 108 may detect a location of each key point for each object image. Key points may be the location of an LED, a port, a bezel, or some other feature depicted in the image. For example, referring back to FIG. 3, datacenter topology analyzer 108 may analyze graphic representation 300 to determine each object image 304 depicts two rows of communication ports, with each row having two sets of 12 ports, a power input in the lower right corner, and any other ports, lights or features found on switch images 304.

At step 522, datacenter topology analyzer 108 may determine pixel-related information for each object image. Pixel-related information may refer to the granularity of an object image by which embodiments may ensure the object can be compared to information stored in device information 116. For example, although FIG. 3 may depict graphic representation 300 at a resolution detailed to allow a person familiar with each specific information handling system to identify object images 302 as being server images and, more particularly, images of Dell PowerEdge R730 servers and object images 306 as being server images and, more particularly, images of Dell PowerEdge 630 servers, each object image 302 may contain additional information. For example, graphic representation 300 may depict an LED light color such as amber, red or green, a bezel color such as silver or gray, and may include labels, logos or text. Also, wired connectors 312 and 314 may be depicted in graphic representation using different line types (as shown with solid and dashed lines) but may also be depicted in graphic representation 300 using different colors or a depiction of a connector plug or end. Thus, if graphic representation 300 is of a datacenter and the datacenter is intended to include multiple Dell PowerEdge R730 servers, embodiments may analyze graphic representation 300 to determine graphic representation 300 represents a datacenter as the type of system for the complex collection of information handling systems, identify an object image 302 in graphic representation 300 as a type of server, determine a number of object images 302 corresponding to the number of that type of server, identify ports, power supply, etc. for each object image 302 and use key points and pixel-related information to identify each object image 302 as representing a Dell PowerEdge R730 server. Identifying ports may include identifying types of ports (e.g., Ethernet ports, Serial Attached SCSI (SAS) cable ports, USB ports, etc.) for connecting using connectors 312 or 314 and how a server represented by object image 302 connects to enterprise network 310.

At step 524, datacenter topology analyzer 108 may determine object image location and information. For example, referring back to FIG. 3, datacenter topology analyzer 108 may analyze graphic representation 300 to determine server images 306 are located at the bottom of graphic representation 300 because they are connected only to switch images 304, whereas switch images 304 located more central because they are connected to server images 302, server images 306 and enterprise network 310.

At step 526, datacenter topology analyzer 108 may determine if an object image is the last object image.

If the object image is not the last object image, datacenter topology analyzer 108 may repeat steps 512-524 until all object images in the system image have been identified, their location is known, the location of key points is known and pixel-related information and object information and location is known.

Based on the analysis of graphic representation 300, datacenter topology analyzer 108 generates a topology requirement list. A topology requirement list may include all the information handling systems identified as part of the complex collection of information handling systems, as well as what wired connectors are needed to connect with other information handling systems (including communication protocols) and operating requirements such as power input and how each information handling system is connected to an enterprise network.

Information for Each Available Information Handling System is Stored in a Database Information about all platform-supported information handling systems, devices and configurations may be stored in database 114. For example, for a Dell PowerEdge MX 7000 Chassis, embodiments may store a set of images of a Dell PowerEdge MX 7000 Chassis along with information about the chassis dimensions, weight, fan specifications, power supply specifications, supported input/output modules (IOM)s, connectors, deployment parameters, along with the supported topologies (e.g., FCOE, iSCSI, SAS, Fabric mode, etc).

Figure 6:
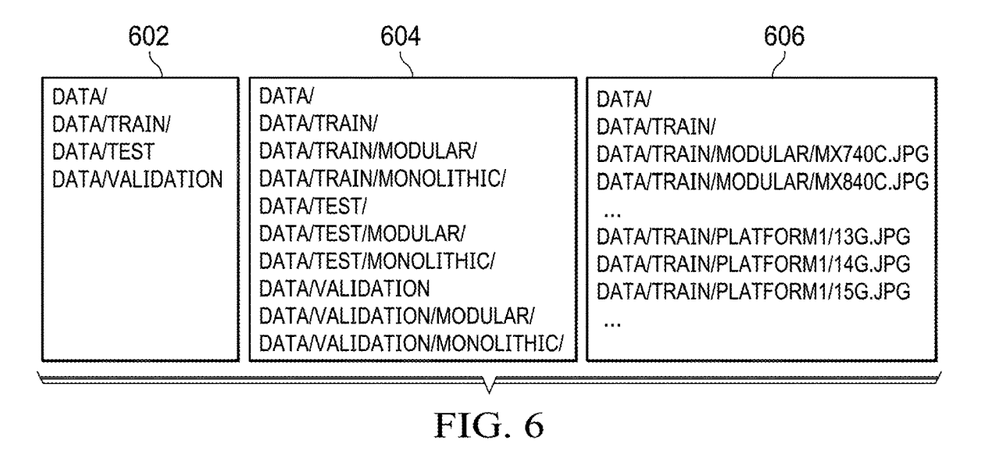
FIG. 6 is a diagram depicting a portion of a data structure storing information about components in a complex collection of information handling systems.

FIG. 6 is a diagram depicting data structures storing information about information handling systems possible in a complex collection of information handling systems.

Data structure 602 depicts information organized in different folders for training, testing and validation. Data structure 604 depicts information stored under more specific folders such as modular and monolithic collections of information handling systems and data structure 606 depicts information such as specific device images and platforms on which a collection of information handling systems may connect.

Data structure 604 may contain information related to training datacenter topology design interface 106 to accurately identify each information handling system represented in graphic representation 300. Data structure 604 may also store information for datacenter topology analyzer 108 to determine connections and operating requirements for each information handling system in a particular system configuration. The information may include a UUID (Unique identification number) and other information specific to an information handling system. Data structure 604 may store information for training topology configuration system 104 to determine a system configuration that can be implemented by a user with little to no knowledge about how the complex collection of information handling system should be connected. The information may include device images, communication protocols, access credential formats and processing parameters based on an intended system configuration. Data structure 604 may store information for testing whether an information handling system is connected to an enterprise network or another information handling system.

Data structure 604 may also information for datacenter configuration creator 110 to develop an intended system configuration and for testing an information handling system is connected in an intended system configuration, and validation packets for datacenter topology validator 112 to validate an actual system configuration matches an intended system configuration. Each of data structures 602, 604 and 606 may be updated with new information as new information handling systems become available.

In some embodiments, database 114 stores pre-loaded factory configurations along with the telemetry information/data stores. In some embodiments, database 114 contains features to add a runtime-trained dataset from a customer datacenter environment dynamically.

Configuration Job Creation

Database configuration creator 110 creates a configuration job corresponding to an intended system configuration for the complex system based on a topology requirement list determined by datacenter topology analyzer 108 and information contained in database 114. Creating the configuration job may include determining an order in which the information handling systems should be connected.

Datacenter configuration creator 110 receives a topology requirement list from datacenter topology analyzer 108 and determines an intended configuration. Based on the topology requirement list, datacenter configuration creator 110 collects information about each information handling system and factory configurations from database 114. Datacenter configuration creator 110 creates a configuration job, communicates instructions to configure the complex collection of information handling systems and tests the system configuration.

Once datacenter topology creator 110 determines the intended system configuration, datacenter topology creator 110 may begin communicating sets of user instructions to the user and sets of device instructions to specific information handling systems to connect each information handling system according to the intended configuration. A first set of instructions may provide the user with instructions to connect a first information handling system to an enterprise network. Once the first information handling system is connected to the enterprise network, datacenter topology creator 110 may use access credentials that the user provided when entering the graphical representation 300 (such as in step 406 above) to begin communicating with the information handling system.

Figure 7:
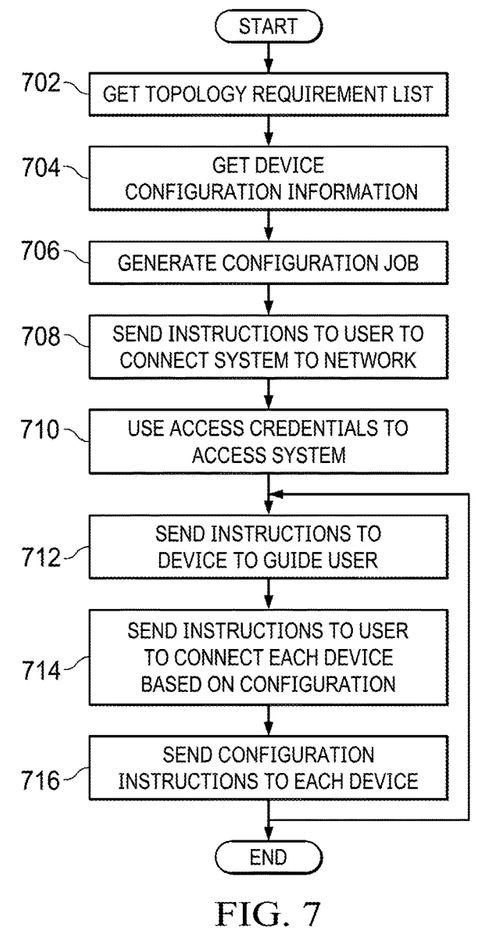
FIGS. 7 and 8 are flowgraphs depicting portions of a method for configuring a complex collection of information handling systems.
Figure 8:
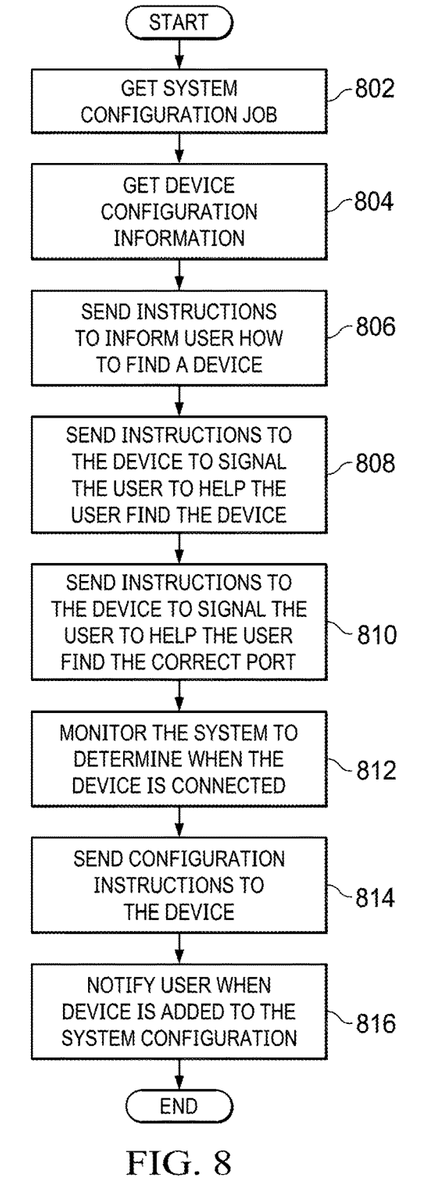

FIGS. 7 and 8 are flowgraphs depicting portions of a method for configuring a complex collection of information handling systems according to an intended system configuration.

At step 702, datacenter configuration creator 110 gets a topology requirement list. A topology requirement list may include all the information handling systems necessary to configure the complex collection of information handling systems.

At step 704, datacenter configuration creator 110 gets device configuration information 120 from database 114. Device configuration information 120 may include information about what type of connectors is needed, power requirements and a physical location of where an information handling system will be installed.

At step 706, datacenter configuration creator 110 generates a configuration job specifying all connections between information handling systems.

At step 708, datacenter configuration creator 110 sends a set of user instructions 124 to a system installer to connect a first information handling system to an enterprise network. The system installer may be the same person as the user who entered the graphic representation 300 or may be a different person. The set of user instructions 124 may include images of the information handling system to be connected and information about what type of connector to use for the connection, a location of the connection point on the information handling system, and any other information to facilitate a person connecting the first information handling system to the enterprise network with little to no knowledge of how the complex collection of information handling systems should be configured.

At step 710, datacenter configuration creator 110 uses access credentials (supplied by the user as described with respect to FIG. 4 above) to access the first information handling system.

At step 712, datacenter configuration creator 110 sends device instructions 122 to an information handling system that is next on the list to be installed and connected to guide the system installer to find the device.

At step 714, datacenter configuration creator 110 sends user instructions 124 to the system installer to connect a device based on the configuration job.

At step 716, datacenter configuration creator 110 sends device instructions 122 to a device that the system installer has connected. Sending device instructions 122 may include sending access credentials for the information handling system such that the information handling system is visible over the enterprise network.

Steps 712-716 may be repeated for each information handling system in the complex collection of devices. Using this approach, a system installer (who may have little or no knowledge of how each information handling system functions or how the collection of information handling systems should interconnect to perform properly) may install and configure a complex collection of information handling systems.

FIG. 8 depicts a flowgraph of a portion of a method for configuring a complex collection of information handling systems and verifying the actual system configuration matches the intended system configuration.

At step 802, datacenter configuration creator 110 gets a configuration job specifying all connections between information handling systems. A configuration job may specify an order in which a plurality of information handling systems should be connected.

At step 804, datacenter configuration creator 110 gets device configuration information 120. Device configuration information may include getting information about what platform is supporting an information handling system, communication protocols and power requirements.

At step 806, datacenter configuration creator 110 sends a set of user instructions 124 to the user (system installer) indicating how to find the information handling system. A set of instructions 124 may include images of an information handling system to be connected and information about what type of connector to use for the connection, a location of the connection point on the information handling system, and any other information to facilitate a system installer connecting the information handling system to the enterprise network.

At step 808, datacenter configuration creator 110 sends a set of device instructions 122 to the information handling system indicating how to signal the user to find the information handling system. The set of device instructions 122 may specify a light having a specific color is turned on and/or blinking, specify a sound be emitted (such as by turning on a fan), or otherwise provide assistance to the user to find the information handling system.

At step 810, datacenter configuration creator 110 sends device instructions 122 to the information handling system to help the user identify the correct port for connecting the information handling system to the enterprise network.

At step 812, datacenter configuration creator 110 monitors the collection of information handling systems on the enterprise network to detect a new connection. In some embodiments, datacenter configuration creator 110 sends a test packet to a particular port. If an information handling system is connected to the port and responds to the test packet, datacenter configuration creator 110 may determine the information handling system is correctly connected to the enterprise network. A test packet may include access credentials for the information handling system.

At step 814, datacenter configuration creator 110 sends device instructions to the new information handling system. Sending device instructions may include sending device configuration information 120 to the information handling system such that the information handling system is visible over the enterprise network.

At step 816, datacenter configuration creator 110 notifies a user that the information handling system is added to the system configuration. The user may be the system installer or a different user more familiar with how the complex collection of information handling systems is expected to function. The user may verify the information handling system is visible over the enterprise network.

As an example, for adding a server to the collection of information handling systems, embodiments may send a set of instructions to a printer to print labels for a wired connector and send a set of instructions to a system installer to attach the labels to the wired connector. The system installer may indicate when the labels are attached and datacenter configuration creator 110 may then send instructions to the server to signal the system installer how to find the server (e.g., emit a sound, turn on a red LED light, make the light blink, etc.) and send instructions to the system installer how to find the server (e.g., listen for the sound, look for a red LED light, look for a blinking light). Once the system installer has indicated they have found the server, datacenter configuration creator 110 may then send instructions to the system installer an indication of a port to which a first end of the wired connector should be connected (e.g., display an image of the server that includes an arrow pointing to a red LED light near the specific port to connect the first end of the wired connector) and send instructions to the server to signal the system installer the location of the port (e.g., turn on a red LED light near the correct port). Datacenter configuration creator 110 may also send instructions to the system installer for how to confirm the wired connector is properly connected (e.g., look for a green LED light) and send instructions to the server to signal the system installer when the wired connector is properly connected to the correct port (e.g., signal an LED on the server to emit a green color). Once the server is connected, datacenter configuration creator 110 may use access credentials for the server to begin communicating with the server and communicate configuration instructions to the server. Datacenter configuration creator 110 may send other sets of instructions to the system installer and each information handling system connected to the enterprise network until all information handling systems in the topology requirement list are connected and configured in the intended configuration. Datacenter configuration creator 110 may send sets of instructions to multiple information handling systems and multiple system installers in parallel, reducing the time needed to configure the complex collection of information handling systems but still verifying that the actual system configuration matches the intended system configuration.

Using this approach, a complex collection of information handling systems may be installed and connected to an enterprise network in the intended system configuration.

Validating the Configuration

Ideally, a complex collection of information handling systems is installed, connected and communicating properly on the first try. To facilitate this, embodiments may validate the complex collection of information handling systems functions correctly.

Figure 9:
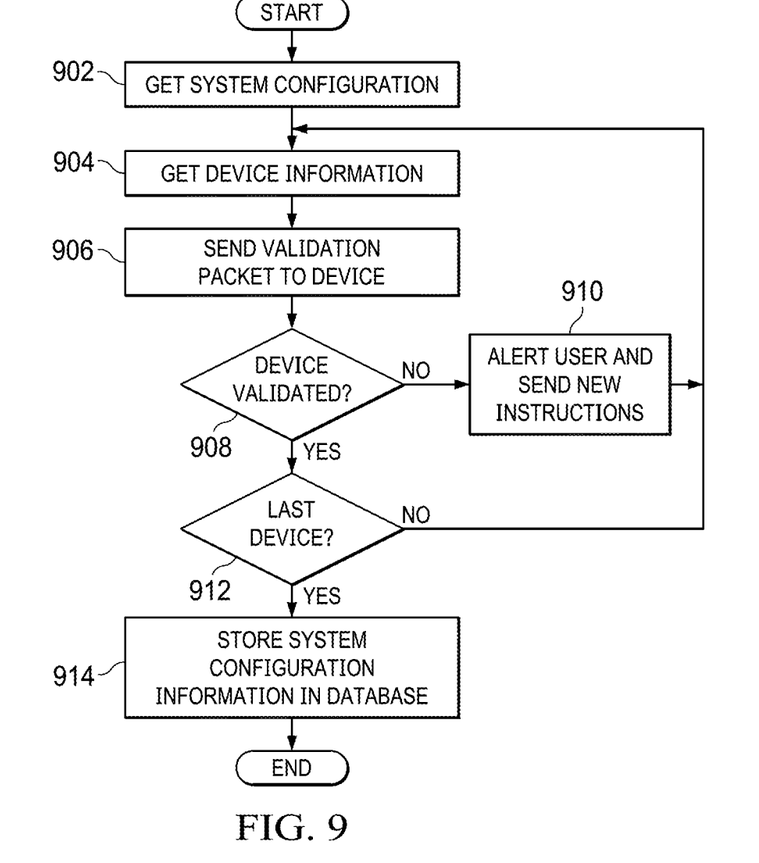
FIG. 9 is a flowgraph depicting a method for validating a configuration of a complex collection of information handling systems.

FIG. 9 depicts a method for validating a configuration of a complex collection of information handling systems.

At step 902, datacenter topology validator 112 gets an intended system configuration from database 114 or datacenter configuration creator 110.

At step 904, datacenter topology validator 112 gets device information for each information handling system.

At step 906, datacenter topology validator 112 sends a validation packet to an information handling system. A validation packet may contain IP/test commands. In some embodiments, a validation packet may include a set of instructions for a first information handling system to communicate with a second information handling system, wherein if the complex collection of information handling systems is configured according to the configuration requirement list, the communication will be successful.

At step 908, datacenter topology validator 112 determines if the information handling system is validated. In some embodiments, an information handling system is validated when the information handling system returns information to datacenter topology validator 112. For example, datacenter topology validator 112 may send a validation packet to a switch with a request for identifying which ports have connectors inserted. A response may specify a number of ports and may include which ports have connectors. Ideally, datacenter topology validator 112 would determine from the response that a switch is connected and that the correct ports have connectors. However, datacenter topology validator 112 might determine from the response that a switch is connected but that an incorrect ports has a connector.

If a device is not validated, then at step 910, datacenter topology validator 112 may interrupt the validation process and alert a user of the issue. In some embodiments, alerting the user may include sending a new set of instructions indicating why the information handling system was not validated (e.g., wrong port, wrong connector, device not visible, wrong communication protocol, etc.). The user may be the system installer or some other user.

If a device is validated, then at step 912, datacenter topology validator 112 determines if the information handling system was the last information handling system in the configuration job.

Steps 904-912 may be repeated until the last information handling system is validated. Steps 904-912 are depicted as validating information handling systems serially, but multiple information handling systems may be validated in parallel.

Validation may occur when the complex collection of information handling systems is completely connected or at stages in the configuration job. If the complex collection of information handling systems is not configured properly or if there are other issues, reconfiguring or correcting the system configuration may be simplified and require less time because all information handling systems are known, all information handling systems and connectors are labeled and topology configuration system 104 knows access credentials for each information handling system.

At step 914, system configuration information may be stored in database 114. Storing system configuration information may include storing information for each information handling system in the collection of information handling systems, information confirming each information handling system was configured according to the requirement list and configuration job, and successful validation. Thus, a subsequent complex collection of information handling systems may be set up more quickly by relying on information associated with a previously successful configuration.

Using approaches based on the above description, configuration of complex collections of devices may be reduced from days to hours and may be completed by persons having little to no knowledge of all the devices, connections, platforms and other aspects associated with interconnecting multiple types of information handling systems in a complex collection of information handling systems.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

The invention claimed is:

1. A method for configuring a complex collection of information handling systems, the method comprising:

storing, in a database of a topology configuration system, device information for each information handling system in a set of information handling systems;

in response to receiving a graphic representation comprising a plurality of object images, wherein each object image represents an information handling system, wherein each information handling system represented by an object is selected for including in a plurality of information handling systems configured for operating as a complex collection of information handling systems:

identifying at least two object images and at least one connection between the at least two object images;

determining, for each object image of the at least two object images:
  a location of the object image in the graphic representation,
  a location of a key point on the object image, and pixel-related information for the object image;
determining a type of information handling system represented by each object image;
determining that the object image matches stored device information for an information handling system in the set of information handling systems; and
determining a type of connector represented by the at least one connection;
determining an intended system configuration for operating the plurality of information handling systems as the complex collection of information handling systems based on a number of the plurality of object images, the type of information handling system corresponding to each object image, and the connection between the at least two object images, comprising: determining a first information handling system of the plurality of information handling systems; determining a second information handling system of the plurality of information handling systems to be connected to the first information handling system; determining a type of connector to connect the first information handling system to the second information handling system; determining a first port on the first information handling system for receiving a first end of a connector; determining a second port on the second information handling system for receiving a second end of the connector; and storing information corresponding to the first information handling system, the second information handling system, the type of connector, the first port and the second port as part of a configuration job;
determining an order for connecting the plurality of information handling systems in the intended system configuration;
providing, based on the order, a first set of user instructions to a user to:
  identify the first information handling system; and
  connect the first information handling system to a network;
communicating with the first information handling system to provide a set of device instructions for each information handling system in the plurality of information handling systems, the set of device instructions comprising a set of device instructions to print a set of labels for the connector; a set of device instructions to the first information handling system to cause the first information handling system to indicate to the user a location of the first information handling system and the first port;
providing additional sets of user instructions to the user, wherein each additional set of user instructions contains one or more of an instruction for the user to:
locate the second information handling system;
select a connector of the type of connector for connecting the first information handling system to the second information handling system; affix the set of labels to the connector; connect a first end of the connector to the first port; and connect a second end of the connector to the second port to connect the second information handling system to the first information handling system with the selected connector;
communicating a set of device instructions to the second information handling system to configure the second information handling system based on the intended system configuration; and
validating the plurality of information handling systems is configured for operating as the complex collection of information handling systems.

2. The method of claim 1, wherein:
the device information comprises an image of an information handling system; and
the graphic representation comprises a system diagram; and
determining that the type of information handling system represented by the object image matches the stored device information for an information handling system in the set of information handling systems comprises determining that the object image in the graphic representation matches the image of an information handling system.

3. The method of claim 1, wherein providing a set of device instructions comprises an instruction to signal the user with one or more of an audible tone and a visual signal.

4. The method of claim 1, wherein receiving a graphic representation further comprises receiving a set of credentials for each information handling system represented by an object image in the graphic representation.

5. The method of claim 1, wherein receiving a graphic representation comprises receiving a logical diagram corresponding to the plurality of information handling systems operating as the complex collection of information handling systems.

6. The method of claim 1, wherein receiving a graphic representation comprises:
  displaying, on a graphical user interface, a digital depiction of at least one object image representing an information handling system;
  receiving a first set of user inputs corresponding to the user selecting a plurality of object images;
  receiving a second set of user inputs corresponding to the user indicating connections between the plurality of object images; and
  storing the first set of user inputs and the second set of user inputs as the graphic representation.

7. A system for configuring a complex collection of information handling systems, the system comprising:
  a database storing device information for each information handling system in a set of information handling systems;
  a user interface for receiving a graphic representation comprising a plurality of object images, wherein each object image represents an information handling system, wherein each information handling system represented by an object image is selected for including in a plurality of information handling systems configured for operating as a complex collection of information handling systems:
  a processor executing instructions to:
    receive the graphic representation;
    identify at least two object images and at least one connection between the at least two object images;
    determine, for each object image of the at least two object images:
      a location of the object image in the graphic representation,
      a location of a key point on the object image, and pixel-related information for the object image;

determine a type of information handling system represented by the object image;
determine that the object image matches stored device information for an information handling system in the set of information handling systems;
determine a type of connector represented by the at least one connection;
determine an intended system configuration for operating the plurality of information handling systems as the complex collection of information handling systems based on a number of the plurality of object images, the type of information handling system corresponding to each object image, and the connection between the at least two object images, wherein the processor executes instructions to identify a first information handling system; identify a second information handling system; determine a type of connector to connect the first information handling system to the second information handling system; determine a first port on the first information handling system for receiving a first end of a connector; determine a second port on the second information handling system for receiving a second end of the connector; and store information corresponding to the first information handling system, the second information handling system, the type of connector, the first port and the second port as part of a configuration job;
determine an order for connecting the plurality of information handling systems in the intended system configuration;
provide, based on the order, a first set of user instructions to a user to:
identify the first information handling system; and
connect the first information handling system to a network;
communicate with the first information handling system to provide a set of device instructions for each information handling system in the plurality of information handling systems, the set of device instructions comprising: a set of device instructions to print a set of labels for the connector; a set of device instructions to the first information handling system to cause the first information handling system to indicate to the user a location of the first information handling system and the first port;
provide additional sets of user instructions to the user, wherein each additional set of user instructions contains one or more of an instruction for the user to locate the second information handling system; select a connector, and the connector; affix the set of labels to the connector; connect a first end of the connector to the first port; connect a second end of the connector to the second port to connect the second information handling system to the first information handling system;
communicate a set of device instructions to the second information handling system to configure the second information handling system based on the intended system configuration; and
validate the plurality of information handling systems is configured for operating as the complex collection of information handling systems.

8. The system of claim 7, wherein:
the device information comprises an image of an information handling system;
the graphic representation comprises a system diagram; and
the processor is configured to determine that the object image in the graphic representation matches the image of an information handling system.

9. The system of claim 7, wherein the set of device instructions comprises an instruction to signal a user with one or more of an audible tone and a visual signal.

10. The system of claim 7, wherein the processor is configured to communicate a request to the user for a set of credentials for each information handling system represented by an object image in the graphic representation.

11. The system of claim 7, wherein the processor Is configured to receive a graphic representation comprising a logical diagram corresponding to the plurality of information handling systems operating as the complex collection of information handling systems.

12. The system of claim 7, wherein the processor is configured to:
display, on a graphical user interface, a digital depiction of at least one object image representing an information handling system;
receive a first set of user inputs corresponding to the user selecting a plurality of object images;
receive a second set of user inputs corresponding to the user indicating connections between the plurality of object images; and
store the first set of user inputs and the second set of user inputs as the graphic representation.

\* \* \* \* \*